(12) United States Patent
Wang et al.

(10) Patent No.: US 7,288,576 B2
(45) Date of Patent: *Oct. 30, 2007

(54) CARBON NANOTUBE-CONTAINING CATALYSTS, METHODS OF MAKING, AND REACTIONS CATALYZED OVER NANOTUBE CATALYSTS

(75) Inventors: Yong Wang, Richland, WA (US); Ya-Huei Chin, Richland, WA (US); Yufei Gao, Blue Bell, PA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/303,233

(22) Filed: Dec. 17, 2005

(65) Prior Publication Data

US 2006/0167120 A1    Jul. 27, 2006

Related U.S. Application Data

(63) Continuation of application No. 10/758,621, filed on Jan. 14, 2004, now Pat. No. 7,008,969, which is a continuation of application No. 10/032,207, filed on Dec. 21, 2001, now Pat. No. 6,713,519.

(51) Int. Cl.
    *C07C 27/00*    (2006.01)
(52) U.S. Cl. ...................... 518/700; 518/715
(58) Field of Classification Search ............... 518/700, 518/715
    See application file for complete search history.

(56) References Cited

U.S. PATENT DOCUMENTS

| | | | |
|---|---|---|---|
| 5,366,719 A | 11/1994 | van Wingerden et al. | |
| 5,645,891 A | 7/1997 | Liu et al. | |
| 6,099,965 A | 8/2000 | Tennet et al. | |
| 6,129,901 A | 10/2000 | Moskovits et al. | |
| 6,232,706 B1 | 5/2001 | Dai et al. | |
| 6,325,909 B1 | 12/2001 | Li et al. | |
| 6,361,861 B2 | 3/2002 | Gao et al. | |
| 6,495,258 B1 | 12/2002 | Chen et al. | |
| 6,514,897 B1 * | 2/2003 | Moy et al. ................. 502/174 |
| 6,713,519 B2 | 3/2004 | Wang et al. | |
| 6,824,689 B2 | 11/2004 | Wang et al. | |
| 7,008,969 B2 | 3/2006 | Wang et al. | |
| 7,011,760 B2 | 3/2006 | Wang et al. | |
| 2003/0035769 A1 | 2/2003 | Moy et al. | |
| 2003/0148086 A1 | 8/2003 | Pfefferle | |
| 2003/0152759 A1 | 8/2003 | Chao | |
| 2004/0007528 A1 | 1/2004 | Bakajin | |

FOREIGN PATENT DOCUMENTS

| | | |
|---|---|---|
| WO | WO 97/032571 | 12/1997 |
| WO | WO 97/032646 | 12/1997 |
| WO | WO 01/051201 | 7/2001 |

OTHER PUBLICATIONS

Office Action from Australian Patent Office mailed on May 9, 2007.
Office Action from European Patent Office mailed on May 11, 2007.
Rodriguez et al., "Carbon Nanotubes: A Unique Catalyst Support Medium," J. Phys. Chem. 1994 pp. 13108-13111.
Rodriguez, "A review of catalytically grown carbon nanotubes," J. Mater. Res. vol. 8, No. 12, Dec. 1993.
International Search Report from PCT/US 02/40874 (Jun. 2003).
Duxiao et al., "Catalytic growth of carbon nanotubes from the internal surface of Fe-loading mesoporous molecular sieves materials," Materials Chem. And Phys., 69, 246-251 (2001).
Johnson et al., "Adhered supported carbon nanotubes," J. Nanoparticle Research, 3, 63-71 (2001).
Huczko, "Template-based synthesis of nanomaterials," Appl. Phys. A. 70, 365-376 (2000).
Ago et al., "Dispersion of metal nanoparticles for aligned carbon nanotube arrays," Appl. Phys. Lett., 77, 79-81 (Jul. 2000).
Xie et al., "Synthesis and Characterization of Aligned Carbon Nanotube Arrays," Advanced Materials, 11, 1135-1138 (1999).
Xu et al., "Controlling growth of field emission property of aligned carbon nanotubes on porous silicon substrates," Appl. Phys. Lett., 75, 481-483 (1999).

\* cited by examiner

*Primary Examiner*—J. Parsa
(74) *Attorney, Agent, or Firm*—Derek Maughan; Frank Rosenberg

(57) ABSTRACT

Methods have been developed to form catalysts having active metals disposed on a carbon nanotube coated porous substrate. Catalysts and reactions over nanotube-containing catalysts are also disclosed. Results are presented showing enhanced performance resulting from use of the inventive catalyst. Mesoporous oxide layers can be utilized to improve catalyst properties.

8 Claims, 10 Drawing Sheets

CARBON NANOTUBE-CONTAINING CATALYSTS, METHODS OF MAKING, AND REACTIONS CATALYZED OVER NANOTUBE CATALYSTS

RELATED APPLICATIONS

This application is a continuation of U.S. patent application Ser. No. 10/758,621, filing date Jan. 14, 2004 now U.S. Pat. No. 7,008,969, which was a continuation of U.S. patent application Ser. No. 10/032,207, filed Dec. 21, 2001, now U.S. Pat. No. 6,713,519.

FIELD OF THE INVENTION

The present invention relates to catalysts containing carbon nanotubes, methods of making catalysts containing carbon nanotubes on porous substrates, systems employing carbon-nanotube-containing catalysts, and reactions catalyzed in porous carbon nanotube-containing catalysts.

INTRODUCTION

Catalysts are crucially important in controlling chemical reactions in virtually all aspects of our lives. For example, catalysts are used to lower the temperature, increase the rate, and control the products in chemical reactions. While catalysts can be liquids or gases, solid catalysts are especially attractive for commercial applications because they are easy to store and transport, are readily separated from product streams, tend to be more environmentally benign, and can provide superior performance and greater control of a reaction.

A well-known problem with solid catalysts is slow heat and/or mass transfer. That is, with solid catalysts and systems employing solid catalysts, the speed of a chemical reaction can be limited by the time necessary for heat to travel to or from the catalyst or by the time needed for chemicals to get to and from the catalyst.

For many years, scientists and engineers have sought better catalyst materials with improved heat and/or mass transport properties. While there are probably thousands of publications and patents that address these problems, two recent patents are discussed herein.

In one approach, van Wingerden et al., in U.S. Pat. No. 6,099,965, described methods of making catalysts having desirable heat transport properties. In one example, particles of an iron-chromium alloy are placed in a steel pipe and sintered in a hydrogen atmosphere. The sintered particles are then heat treated in air and then treated with a suspension of alumina and $Fe_2O_3/Cr_2O_3$.

Tennet et al., in U.S. Pat. No. 6,099,965, described a catalyst comprising a rigid carbon nanotube structure and a catalytically effective amount of a catalyst supported thereon. Numerous advantages of this structure including enhanced heat and mass transfer are discussed (see col. 16, lines 8-65).

Despite the prior work, there remains a need for novel solid catalyst materials that have superior heat and/or mass transport capabilities.

SUMMARY OF THE INVENTION

In a first aspect, the invention provides an engineered catalyst that includes a support material having through-porosity (defined as discussed below), a layer comprising carbon nanotubes on the support material; and a surface-exposed catalytically-active composition.

In another aspect, the invention provides catalyst including a support; nanotubes dispersed over the support; and a catalytically-active composition dispersed over the nanotubes.

In yet another aspect, the invention provides a method of forming a porous carbon nanotube containing catalyst structure. In this method, a large pore support is provided having through porosity. Carbon nanotubes are formed over the large pore support, and a catalyst composition is deposited over the carbon nanotubes.

The invention also includes methods of conducting catalyzing chemical reactions in which one or more reactants are contacted with any of the carbon nanotube containing catalysts described herein. In this method, the one or more reactants react to form a product. The catalyst catalyzes the reaction relative the same reaction conducted in the absence of a catalyst. For example, the invention provides a Fischer-Tropsch process in which a gaseous composition, comprising CO and hydrogen, is passed over any of the carbon nanotube containing catalysts described herein.

The invention also provides a catalytic process for aqueous phase hydrogenations to produce higher value chemical products from biomass feedstock.

In another aspect, the invention provides a process of making a porous, carbon nanotube-containing structure, comprising: providing a support material having through-porosity; depositing seed particles on the support material to form a seeded support material; and heating the support material and simultaneously exposing the seeded support to a carbon nanotube precursor gas to grow carbon nanotubes on the surface of the seeded support material.

In another aspect, the invention provides a porous carbon-nanotube-containing structure that includes a large pore support having through porosity; and carbon nanotubes disposed over the large pore support.

In still another aspect, the invention provides a method of making a carbon-nanotube-containing structure in which a surfactant template composition (a composition containing a surfactant and silica or silica precursors) is applied onto a support. Carbon nanotubes are then grown over the layer made from the surfactant template composition.

The invention also provides processes of using carbon nanotube-containing structures. Preferably, any of the carbon nanotube-containing structures described herein can be used in processes including: adsorption, ion exchange, separation of chemical components, filtration, storage of gases (for example, hydrogen or carbon dioxide), distillation (including reactive distillation), as a support structure for chemical or biological sensors, and as a component in a heat exchanger. Features of carbon nanotube-containing structures that make these structures particularly advantageous include: high surface area, excellent thermal conductivity, capillary force for enhanced condensation, and good attractive force for certain organic species.

Thus, the invention provides a method of adsorbing a chemical component in which a chemical component is contacted with a carbon nanotube-containing structure and the chemical component is adsorbed on the surface of the carbon nanotube-containing structure. A preferred chemical species is hydrogen. In a preferred embodiment, the exterior surface of the carbon nanotube-containing structure is a palladium coating. In preferred embodiments, the adsorption is run reversibly in a process such as pressure swing or temperature swing adsorption. This method is not limited to adsorbing a single component but includes simultaneous adsorption of numerous components.

Similarly, the invention provides a method of separating a chemical component from a mixture of components. "Mixture" also includes solutions, and "separating" means changing the concentration of at least one component relative to the concentration of at least one other component in the mixture and preferably changes the concentration of at least one component by at least 50% (more preferably at least 95%) relative to at least one other component—for example reducing the concentration of a 2M feed stream to 1M or less. Particular types of separations include filtration, selective adsorption, distillation and ion exchange. Filtering can be accomplished, for example, by passing a mixture having at least two phases through a porous carbon nanotube-containing structure where at least one of the phases gets physically caught in the structure. A carbon nanotube-containing structure with surface-exposed carbon nanotubes can function efficiently for the separation of some organics because the nanotubes can be hydrophobic while organics can be adsorbed quite well. For ion exchange it is desirable to coat the surface with an ion exchange agent.

The preparation of porous materials, such as foams, coated with carbon nanotubes and a high-surface area metal oxide coating, can be difficult. The locally aligned nanotubes exhibit high surface Van der Waal forces and hydrophobic properties. Conventional wash coating of metal oxides using aqueous based solution often results in a non-uniform coating or poor adhesion onto the nanotubes. We have developed treatment methods to modify the surface properties of the nanotubes, making this new class of materials possible for application as engineered catalyst structure. We have fabricated carbon nanotube-based engineered catalyst and have demonstrated its performance for Fisher-Tropsch reaction in a microchannel reactor. Under operating conditions typical of microchannel reactors with minimal heat and mass transfer limitations, it was found that the integrated nanotubes substrate has further improved the performance, as indicated by enhanced reaction rate and improved product selectivity. This concept can also be applied toward conventional reactors, which operate under severe heat and mass transfer inhibitions with catalyst performance far less than that predicted from the intrinsic kinetics.

Various embodiments of the present invention can offer numerous advantages, including: creating larger pores through which reactants/products transport to the catalytic sites, improved heat transport, controlling the direction of heat transport, enhanced surface area, excellent thermal stability, excellent thermal conductivity, reduced mass transfer limitations, utility in microreactors, ready adaptability in fixed-bed type reactors, and increased catalyst loading levels.

The surface area enhancement that arises from these nanoscale fibers can greatly increase the catalyst site density within a fixed reactor volume. The potential to create larger pore size naturally generated from the interstices between carbon nanotubes can be beneficial for reactions involving both gas and liquid phases liquid reactants or products on a solid catalyst, since the transport of gas phase molecules through the liquid phase inside the pores is often the rate-limiting step which not only hinders the reaction rate but also adversely affects product selectivity.

In this application, "pore size" and "pore size distribution" can have different meanings as explained below. "Pore size" can be measured by (optical or electron) microscopy where pore size distribution and pore volume are determined statistically from counting in a field of view (of a representative portion of the material) and pore size of each pore is the average pore diameter. Pore size is determined by plotting pore volume (for large pore materials the volume of pores having a size of less than 100 nm can ignored) vs. pore size and "average pore size" is the pore size at 50% of the existing pore volume (e.g., for a material that has a 40% pore volume, the "average pore size" is the size of the largest sized pore that adds with all smaller sized pores to reach 20% pore volume). Where practicable, the pore size and pore volume are measured on a cross-section of the material that may be obtained with a diamond bladed saw. For an isotropic material any representative cross-section should produce the same results. For anisotropic materials the cross-section is cut perpendicular to maximum pore length.

Alternatively, pore size and pore size distribution can be measured by nitrogen adsorption and mercury porisimetry.

A "large pore" support (or other material) is a support that is characterized by the presence of pores having a pore size (diameter) of at least 100 nm, more preferably at least 1 µm, and in some embodiments 500 nm to 400 µm. Preferably, these supports have through porosity, such as in honeycombs, foams or felts.

"Through porosity" means that (1) when a "through porosity" material is sized (sized means cut or grown—that is, a through porosity material need not be 1 cm in length, but for testing purposes could be grown or manufactured) to a length of 1 cm (or at least 0.1 cm if 1 cm is unavailable) and oriented in the direction of maximum flow, a measurable amount of argon gas will flow through the intact material, and (2) a cross-section taken at any point perpendicular to flow (for example, where the material is disposed within a reactor) shows the presence of pores, and, in the large pore materials, the presence of large pores. In the present invention, the interstices between packed, unsintered powder particles or pellets do not qualify as through porosity (although powders sintered to form larger materials would qualify). By definition, materials having only pitted surfaces (such as anodized aluminum) do not have through porosity, and mesoporous silica (by itself) does not have through porosity. Anodized aluminum is not a through porosity material.

A "carbon nanotube" is primarily or completely carbon in a substantially cylindrical or rod-like form having a diameter of less than 200 nm, preferably in the range of 4 to 100 nm. "Nanotubes" may include both tubes and rods.

An "engineered catalyst" means a catalyst having a porous support, carbon nanotubes, and a catalytically active material disposed over at least a portion of the nanotubes.

BRIEF DESCRIPTION OF THE FIGURES

FIG. 3b is a higher magnification view of the foam of FIG. 3a.

FIG. 4b is a higher magnification view of the foam of FIG. 4a.

FIG. 4c is a higher magnification view of the foam of FIG. 4a.

DETAILED DESCRIPTION OF THE INVENTION

Figure 1A:
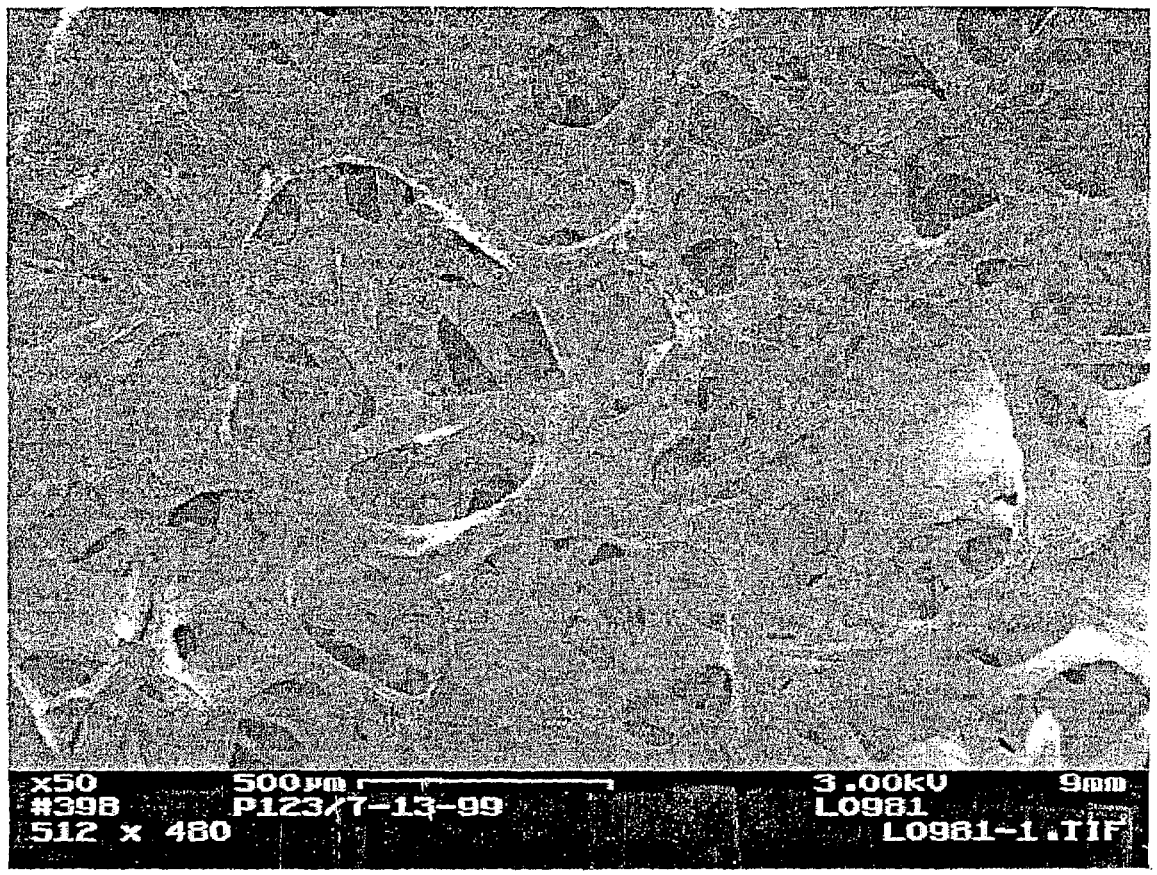
FIG. 1a is a scanning electron micrograph (SEM) of a metal alloy foam.

In some embodiments, support materials of the present invention preferably have through-porosity, preferably these pathways are sufficiently large to allow molecular diffusion at room temperature. In some preferred embodiments, the support is a porous material having a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. Preferred forms of the support are foams, felts (i.e., nonwoven accumulations of strands or fibers), meshes, membranes, and honeycombs. In some particularly preferred embodiments, the support has tortuous porosity with interconnected passages, such as in foams; this tortuosity creates more desirable flow patterns for better mixing and heat transfer. Another preferred form is a microchannel (that is, a channel having a width and/or height of 1 mm or less) array. Other embodiments of the invention can have supports of larger dimensions, for example a minimum dimension of 1 cm (i.e., each of height, length and width are more than 1 cm).

The support can be made of a variety of materials such as ceramic, but in embodiments requiring rapid heat transport, the support preferably is a thermally conductive material such as a metal. In some particularly preferred embodiments, the support is stainless steel, or an alloy such as monel. In other embodiments, preferred support materials include cordierite, silica, alumina, rutile, mullite, zirconia, silicon carbide, aluminosilicate, stabilized zironia, steel and alumina-zirconia blend. For use in hydrothermal conditions, preferred supports include zirconia and carbon.

In other embodiments, where through porosity is not necessary, the support can be a thin membrane of anodized aluminum (a macroporous aluminum oxide membrane) or other macroporous membrane (with a volume average pore diameter of at least 20 nm, for example, commercially available ceramic membranes with the macropores straight through the membrane thickness) that is optionally treated with a surfactant template composition such that mesoporous silica substantially fills the macropores. Carbon nanotubes are applied to form a membrane that can be used, for example, as a molecular sieve, an adsorbent, or treated with an ion exchange medium. The inventive structures made with an adherent mesoporous silica layer disposed between the support and the carbon nanotubes may or may not have through porosity. "Substantially fills" the macropores means that the mesoporous silica extends completely across the diameter of a macropore but does not necessarily completely fill each macropore.

The carbon nanotubes are preferably at least 90 mol % C, more preferably at least 99 mol % C. The nanotubes may have a metallic nanoparticle (typically Fe) at the tips of the nanotubes. The nanotubes have a length to width aspect ratio of at least 3; more preferably at least 10. The nanotubes preferably have a length of at least 1 µm, more preferably 5 to 200 m; and preferably have a width of 3 to 100 nm. In some preferred embodiments, as measured by SEM, at least 50% of the nanotubes have a length of 10 to 100 µm. Preferably, of the total carbon, as measured by SEM or TEM, at least 50%, more preferably, at least 80%, and still more preferably, at least 90% of the carbon is in nanotube form as compared to amorphous or simple graphite form.

Depending on the intended use, the distribution of nanotubes can be tailored to obtain the desired characteristics, for example, surface area and thermal transport. The nanotubes preferably have an average separation (from central axis to central axis, as measured by SEM) of from 10 to 200 nm, more preferably 20 to 100 nm. Having close neighbors, means that the nanotubes will be highly aligned. In some preferred embodiments, the nanotubes are sufficiently dense to cover the underlying support, as measured by SEM. In some preferred embodiments, the material includes nanotubes arranged in clumps on the support where there is a high degree of nanotube alignment within each clump (see, e.g., FIG. 1b). Preferably, the surface area of the article, as measured by BET/$N_2$ adsorption, is at least 50 $m^2/g$ nanotubes, in some embodiments 100 to 200 $m^2/g$ nanotubes; and/or at least 10 $m^2/g$ (nanotubes+support), in some embodiments 10 to 50 $m^2/g$ (nanotubes+support). Size and spacing of the carbon nanotubes can be controlled by control of the surfactant template composition; for example, larger diameter nanotubes can be obtained by use of larger surfactant molecules.

A "catalyst composition" is a composition of matter that will catalyze a chemical reaction. Preferred embodiments of the invention include a catalyst composition that is exposed on at least one surface. The invention is not limited to specific catalyst types. In applications where a catalyst composition (or a catalyst composition precursor) is deposited directly on the nanotubes, the catalyst composition may be any of the catalysts used on carbon supports. Additional layers can be deposited on the nanotubes to support a desired catalyst. Typical catalysts include metals and metal oxides. Especially preferred catalysts include: Fischer-Tropsch catalysts (to cite one example, Co-based catalysts), and steam reforming catalysts. Knowledge of the scientific literature and routine experimentation can be used by skilled workers to select appropriate catalyst compositions for reactions such as acetylation, addition reactions, alkylation, dealkylation, hydrodealkylation, reductive alkylation, amination, aromatization, arylation, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanol synthesis, methylation, demethylation, metathesis, nitration, partial oxidation, polymerization, reduction, steam and carbon dioxide reforming, sulfonation, telomerization, transesterification, trimerization, water gas shift (WGS), and reverse water gas shift (RWGS).

The inventive structures may include additional materials such as carbide, nitride, sulfide, or oxide layers or metal layers. A particularly preferred interlayer material is a mesoporous thin silica film, preferably disposed between the support and the nanotubes. Mesoporous materials are described in publications such as U.S. Pat. No. 5,645,891, which is incorporated herein, and D. Zhao, P. Yang, N. Melosh, J. Feng, B. F. Chmelka, and G. D. Stucky, Adv. Mater., 1998, Vol. 10, No. 16, P1380-1385. These mesoporous interlayers offer numerous advantages including enhanced surface area (typically 800 to 1000 $m^2/g$ silica) and providing uniform microenvironments for catalysis (for example, while the supports can be anisotropic, the mesoporous interlayer can put the same material and same pore size throughout the structure—this promotes uniform deposition of nanoparticle seeds and, therefore, uniform nanotubes). In some preferred embodiments, the mesoporous film is codeposited with metallic nanoparticles, such as Fe nanoparticles, that serve as seeds for nanotube growth.

In another preferred embodiment, an oxide layer or layers are disposed between the support and the nanotubes. A thin oxide layer can be formed on metal supports, for example, by heat treatment in the presence of oxygen. This oxide layer can improve adhesion of subsequent oxide layers, and protect the underlying support from degradation. Alternatively, or in addition, a metal oxide layer can be deposited over the support. For example, an alumina layer can be deposited (preferably a dense layer applied by chemical vapor deposition) onto the support before applying the nanotubes. The oxide layer(s) may enhance adhesion between the ceramic-metal interface, as well as protecting the underlying support from degradation during preparation or use. An oxide layer is especially desirable over a metal support. The thickness of the oxide layer(s) in some embodiments is preferably less than about 200 nm, and, in some embodiments is in the range of 0.05 to 5 μm, and in some embodiments is in the range of 100 to 1000 nm. Ideally, these oxide layer(s) should be thick enough to promote formation of a dense nanotube layer, but thin enough to have little adverse affect on thermal conductivity.

An oxide layer can be disposed over the carbon nanotubes by washcoating or vapor coating. In a preferred embodiment, the nanotubes surface can be oxidized (or partly oxidized). Oxidation can be done, for example, by exposure to air at elevated temperature. Preferred conditions are 350 to 500° C. for at least one minute; more preferably 400 to 500° C. for 2 to 50 minutes. Other oxidation methods could alternatively be used, for example, treatment with an acidic solution, or coating with a layer of vapor deposited hydrophilic material. It is believed that these treatments modify the nanotube surfaces such that the washcoating solution is absorbed into the interstices during subsequent coating steps.

In especially preferred embodiments, an oxide layer is, or includes, a mesoporous silica layer. A mesoporous silica layer may be formed along with nanoparticles which seed the growth of carbon nanotubes. Each mesoporous silica layer preferably has a thickness of between 0.5 and 3 μm.

In another embodiment a carbon nanotube-containing includes a layer of an electroactive compound, preferably an electroactive polymer, disposed either between the support and the nanotubes or over the nanotubes. Such structures can be used to separate chemical components. In these embodiments, the support is preferably electrically conductive such as a metal mesh.

Some inventive catalysts or carbon nanotube-containing structures can be characterized by their properties. In this context, catalysts are defined to include all the components including support, nanotubes and catalytically active component (such as a reduced metal). The catalysts or carbon nanotube-containing structures preferably have through porosity, preferably have large pores, and are preferably a porous material having a pore volume of 5 to 98%, more preferably 30 to 95% of the total engineered catalyst's or carbon nanotube-containing structure's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. The engineered catalyst or carbon nanotube-containing structures preferably has a surface area of at least 0.05 $m^2/g$, more preferably at least 0.5 $m^2/g$, and in some embodiments between 0.1 and 100 $m^2/g$. The catalyst or carbon nanotube-containing structure is preferably not a powder, and more preferably is a monolith having a volume (including voids) of at least 5 $mm^3$, and in some embodiments 5 to 5000 $mm^3$. In preferred embodiments, a reactor could have monolith packing (that would have many small monoliths) or large catalyst inserts, where a single piece is loaded into the reactor. Alternatively, or carbon nanotube-containing catalysts can be in the form of pellets or powders and used in conventional fixed or fluidized bed reactors.

The inventive catalysts can also be characterized by their reactivity. For example, a Fischer-Tropsch catalyst according to the present invention, when tested at 265° C., at 16 atm, a $H_2/CO$ ratio of 2, and a 250 msec contact time, preferably exhibits: a CO conversion of at least 25%, more preferably at least 35%, and in some embodiments about 30 to about 45%, a methane selectivity of less than 35%, more preferably less than 30%, and in some embodiments about 35 to about 25%; and a specific activity (defined as mmol CO converted per gram of total metal (which may include Co+Re, etc. but does not include metal in oxide support) per hour) of at least 1500, more preferably at least 2000, and in some embodiments 1800 to about 2400.

In some preferred embodiments, the fabricated catalyst or carbon nanotube-containing structures contains 0.1 to 20 weight % carbon.

The inventive structures are preferably disposed within microdevices such as microreactors with integral or adjacent heat exchangers, preferably microchannel heat exchangers. Examples of reactor configurations are disclosed in U.S. Pat. No. 6,680,044, which is incorporated herein by reference as if reproduced in full below. In one preferred embodiment, the invention comprises a reaction chamber and at least one adjacent heat exchange chamber. The catalyst (including support, nanotube layer and catalyst) can be sized to match the flow path of the reaction chamber such that flow is substantially through the pores of, rather than around the body of, the catalyst. In some preferred embodiments, the engineered catalyst (including voids within the catalyst) occupies at least 80%, more preferably at least 95%, of a cross-sectional area of the interior of a reactor chamber.

Preferably, the engineered catalyst is a single piece (monolith) or line of pieces in the reaction chamber occupying at least 80 or 95% of the cross-sectional area of the interior of a reactor chamber. Preferably, the engineered catalyst is a removable piece or pieces rather than a coating.

Other devices for alternative embodiments of the invention include devices for distillation (such as described in U.S. Pat. No. 6,875,247 by TeGrotenhuis et al. filed Dec. 5, 2001 which is incorporated herein by reference as if reproduced in full below) including reactive distillation, gas storage (such as devices for swing adsorption described in U.S. Pat. No. 6,508,862 filed Apr. 30, 2001 which is incorporated herein by reference as if reproduced in full below)

Support materials can be obtained commercially. Supports can also be made by known techniques. Optionally, an intermediate layer or layers can be applied to the support. The intermediate layer(s) can be applied by known methods such as wash coating and vapor deposition. The support, or intermediate layer if present, is then seeded with nanoparticles, preferably iron nanoparticles. This can be achieved by applying an aqueous metal solution followed by calcination to form the nanoparticles.

In some particularly preferred embodiments, a mesoporous silica layer is deposited on the support. See the Examples for a description of a suitable technique for depositing a mesoporous layer. The mesoporous silica layer can be formed from compositions containing silica precursors and surfactant. To make nanoparticles for seeding nanotubes, the composition may also contain a nanoparticle precursor such as a transition metal complex. In preferred embodiments, a composition comprising surfactant and silica precursor, or a composition containing the transition metal complex, or both, are aged before they are combined (aging can be, for example, at least 5 minutes or at least 30 minutes); this allows the hydrolysis reaction to proceed before combining. Preferably a composition containing surfactant and silica precursor also includes an acid, preferably HCl. Preferably a composition containing surfactant and silica precursor also includes an alcohol, preferably the silica precursor is a silicon alkoxide and the alcohol has the same hydrocarbon moiety as the alkoxide. The higher the amount of surfactant and TEOS in the solution, the thicker the resulting coating. The composition for forming a mesoporous layer can be coated, preferably by dip coating or spray coating, and then dried and heated in air, preferably at a temperature of 10 to 500° C. Dip coating typically results in a coating thickness of about 1 μm. The thickness of the mesoporous silica layer is preferably at least 1 μm, and in some embodiments 1 to 5 μm. Coatings less than 1 μm result in undesirably sparse nanotubes. Mesoporous coatings thicker than about 5 μm are undesirable because cracks will form during drying which can lead to flaking (nonadherence). One dip coating is preferred over multi-dips because a second coating will seal the pore mouths of the first layer—thus the pores of the first layer cannot be effectively used for nanotube growth. Templating agents such as $C_{16}EO_{18}$ can increase the size and spacing of nanotubes as compared with smaller agents.

Carbon nanotubes may be formed by pyrolysis of a carbon-containing gas such as ethylene, acetylene or CO. Preferably the nanotubes are grown at 600-1000° C., with tube length increasing with time. For higher purity, growth is conducted in alternating cycles of tube growth and oxidation to remove amorphous carbon. If desired, the nanotubes may be treated such as by heating in air to form an oxidized surface. Preferably the surface is oxidized to a sufficient extent to make the surface hydrophilic, preferably with a static contact angle of less than 30°.

A catalytically active component or components (typically through catalyst composition precursors which are subsequently treated to produce a catalyst composition) can be applied directly on the nanotubes or over intermediate layer(s) disposed over the nanotubes. The as-grown carbon nanotubes are hydrophobic in nature, thus, aqueous or other polar solvents containing metal or oxide catalyst precursors absorb minimally on these nanotube sponges. For this reason, surface treatment prior to dip coating is highly desirable to modify the surface properties. In order to enhance the absorption of catalyst precursors or other compositions, the wall of the nanotube sponges may be oxidized, for example, at moderate temperature in the presence of $O_2$, etched in an acid solution (preferably nitric acid), or exposed to a peroxide. After oxidation, the uptake of the precursor solvents increases dramatically. After dip coating, the substrate is annealed at high temperature to remove the $H_2O$ absorbed by capillary forces within the sponge structure and to decompose the metal precursors. Alternatively to dip coating, catalyst component or catalyst component precursors can be applied by wash coating, vapor depositing, electrolytically depositing or depositing in nonpolar solvents.

The nanotubes can also be functionalized by treatment with a diene or known functionalizing reagents.

The nanotube layer and/or a catalyst structure can be treated to obtain a hydrophilic or hydrophobic surface depending on the intended use.

Another approach for depositing a layer of thin oxide film on the nanotube structure is to immerse the substrate into a surfactant templated sol solution containing the ceramic and metal precursors. In this case, the templated liquid crystals preferentially anchor on the surface of the nanotubes. Subsequent drying and annealing at high temperature removes the surfactant molecules, resulting in an oxide layer with well-defined pore structures that adhere strongly onto the nanotube surface. The physical properties of the oxide formed depend on the surfactant/alcohol/water/precursor ratio.

Chemical reactions using the carbon-nanotube-containing catalysts are also part of the invention. Examples of these reactions include: synthesis of hydrocarbons from CO and $H_2$, steam reforming, acetylation, addition reactions, alkylation, dealkylation, hydrodealkylation, reductive alkylation, amination, aromatization, arylation, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanol synthesis, methylation, demethylation, metathesis, nitration, partial oxidation, polymerization, reduction, steam and carbon dioxide reforming, sulfonation, telomerization, transesterification, trimerization, water gas shift (WGS), and reverse water gas shift (RWGS). Reactions can be in liquid, gas, or liquid/gas, and gas/liquid/solid phase. Particular advantages with the inventive catalyst structure are expected in the reactions where heat and mass transfer limitations are significant, such as liquid phase oxidation and hydrogenation reactions.

The inventive carbon nanotube-containing structure can also be advantageously used in aqueous phase and hydrothermal conditions, for example, as a catalyst support. Examples of aqueous phase reactions and hydrothermal reactions and conditions are described in Elliott et al., U.S. Pat. Nos. 5,814,112, 5,977,013, 6,152,975 and 6,235,797, which are incorporated herein as if reproduced in full below. Thus, the invention includes any of the aqueous phase reactions described in the foregoing patents in combination with the inventive catalysts.

EXAMPLES

Figure 1B:
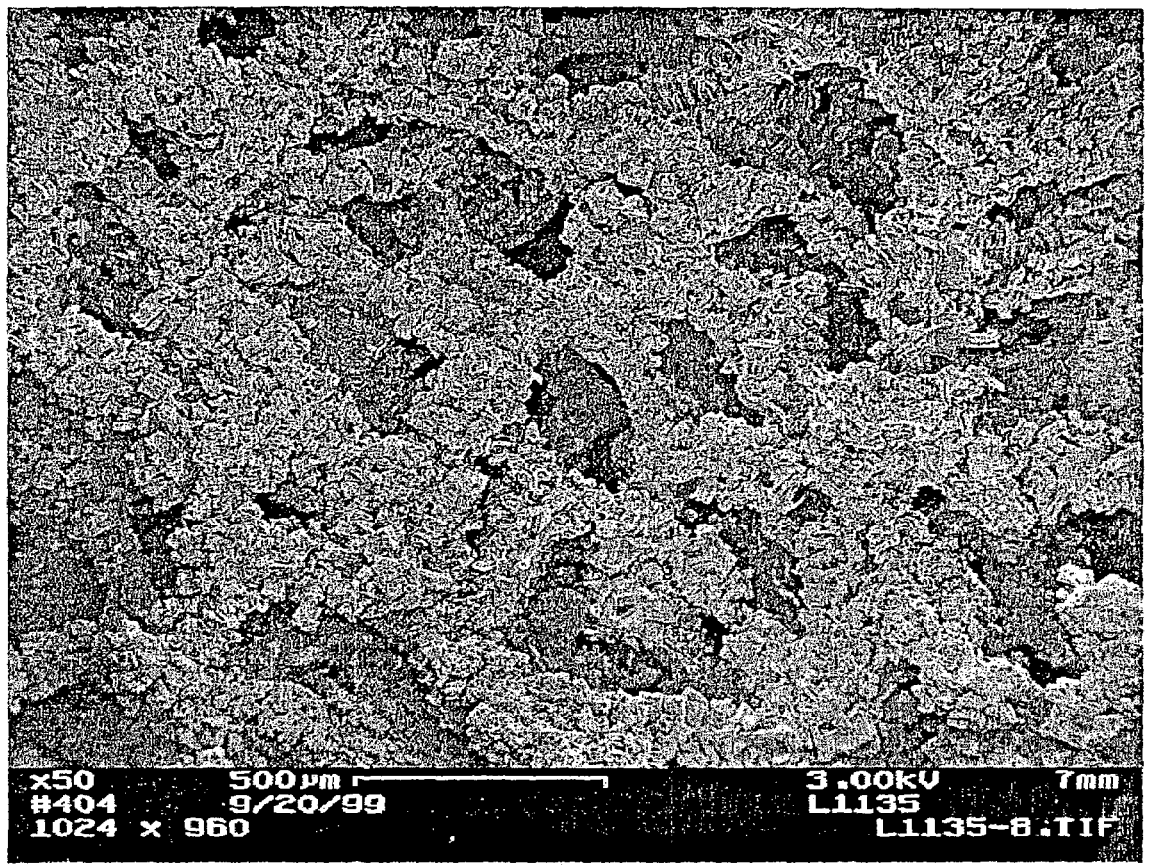
FIG. 1b shows an SEM of a metal foam having a coating of carbon nanotubes.
Figure 1C:
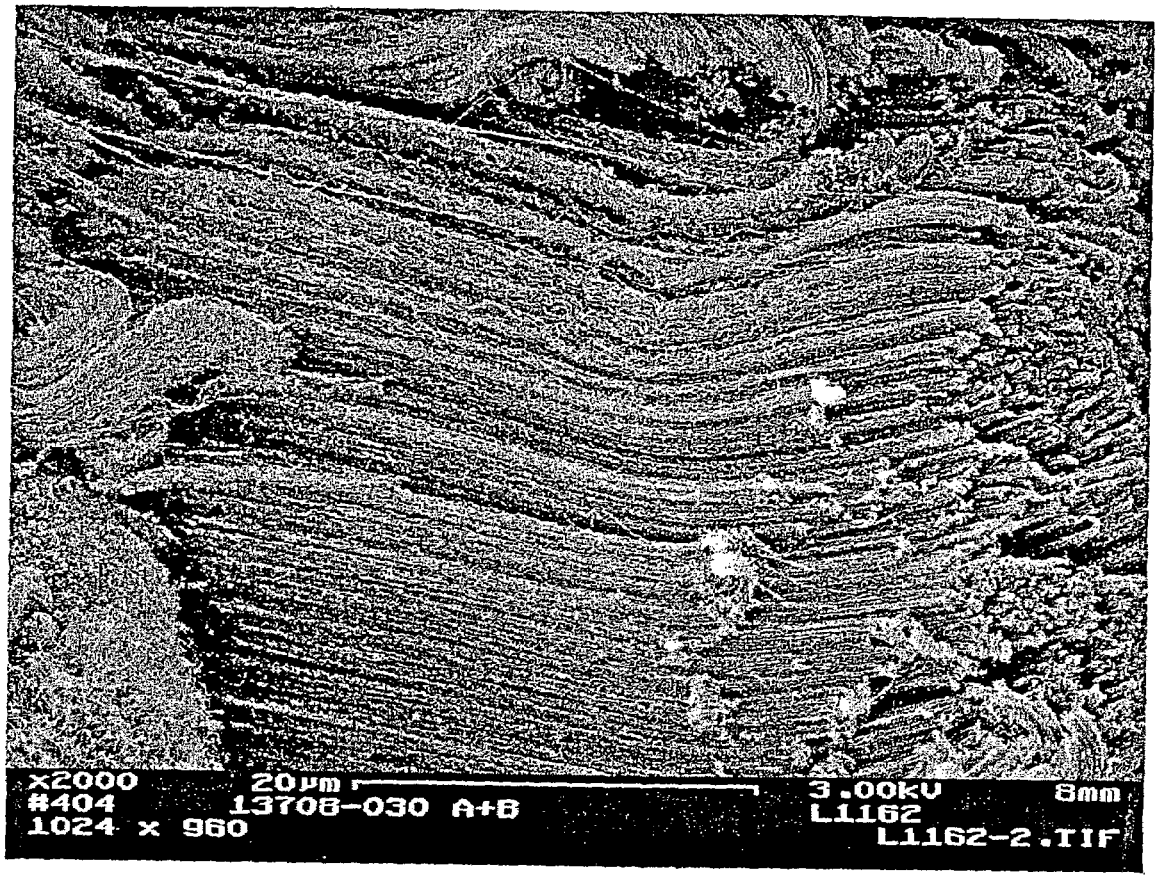
FIG. 1c is a higher magnification view of the foam of FIG. 1b.
Figure 1D:
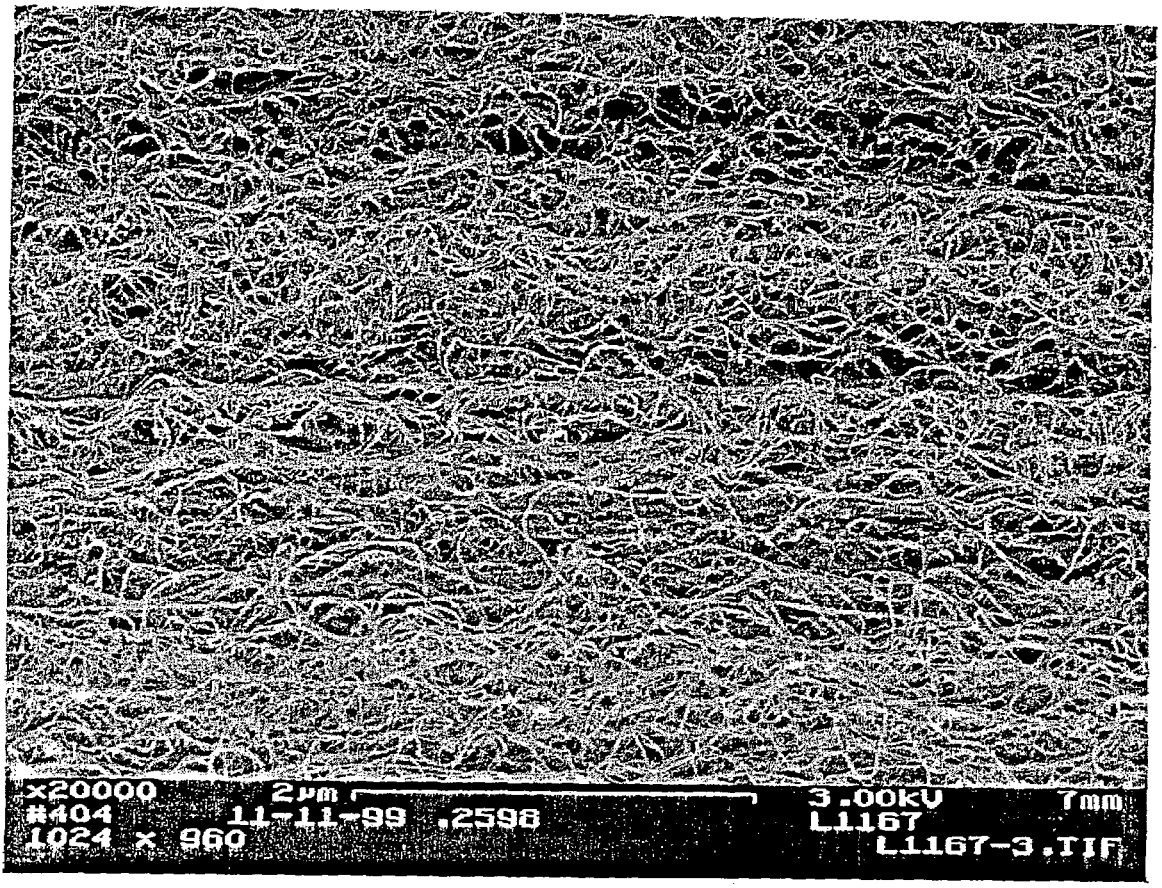
FIG. 1d is a higher magnification view of the foam of FIG. 1b.

Layered, aligned carbon nanotubes on metal and ceramic foams were prepared and characterized. The figures show various SEM views of various coated and uncoated foams. FIG. 1a is an SEM view of a FeCrAlY alloy foam. FIG. 1b shows the same type of foam after depositing carbon nanotubes. From the photomicrograph, one can see chunks of aligned nanotubes coating the foam while leaving large pores through the structure. Higher magnification views are shown in FIGS. 1c and 1d. In FIG. 1d the carbon nanotubes appear curved and wavy (kinked). Thus, the nanotubes have a local alignment (see, e.g., FIGS. 1b, 1c) but a jumbled, high surface area orientation at a very high magnification. Thus showing a preferred arrangement in which nanotube alignment is observed at 2000× magnification while substantial kinkiness is observed at 20,000×. The interior of a nanotube-coated metal foam support was viewed by SEM of a cross-sectional cut (not shown) demonstrated that the technique was effective to cover surfaces throughout a large pore support.

Figure 2A:
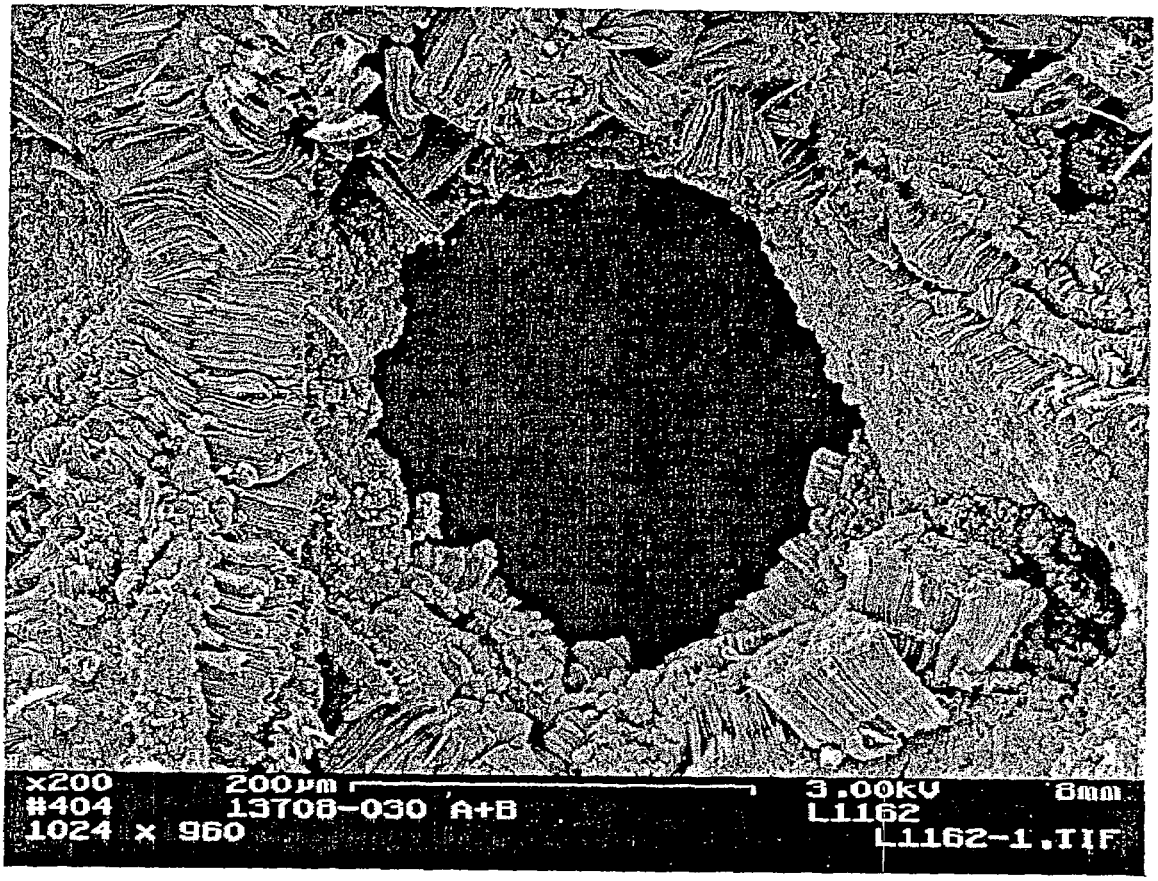
FIG. 2a shows an SEM of a foam having a coating of carbon nanotubes.
Figure 2B:
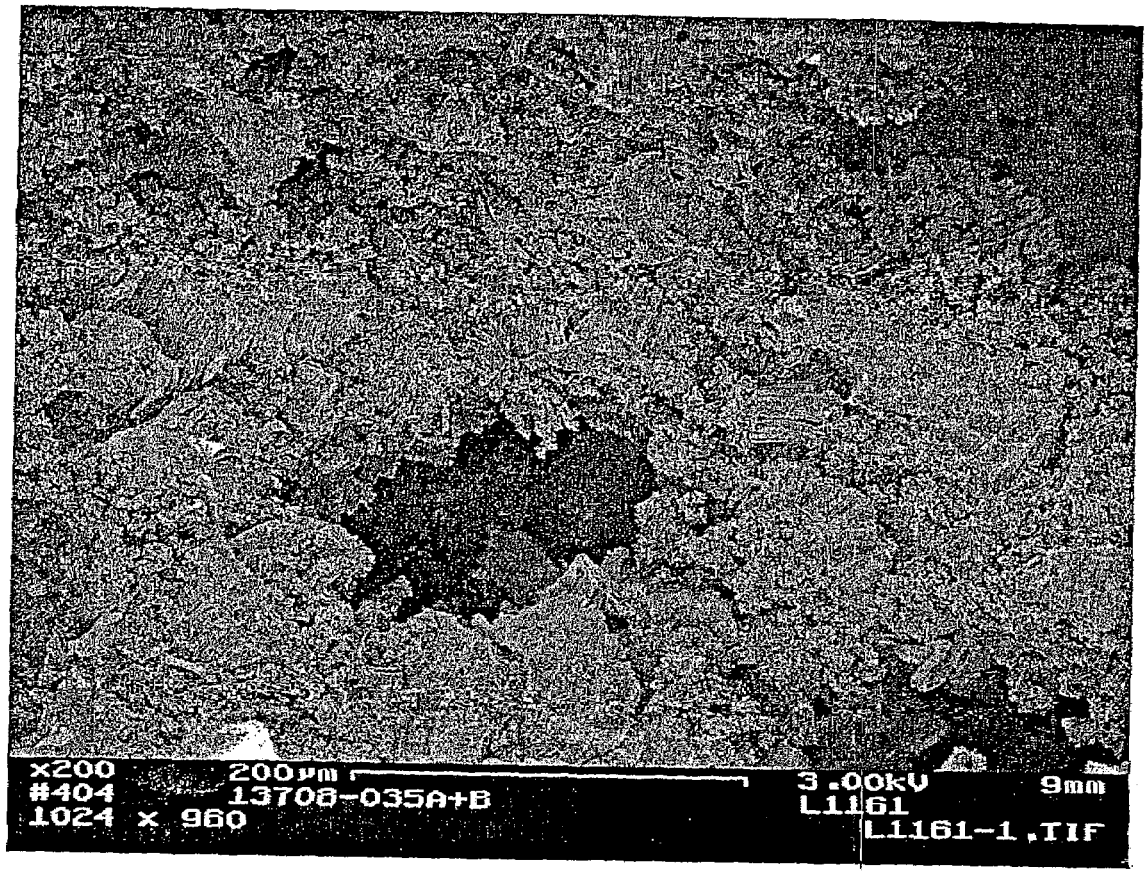
FIG. 2b shows an SEM of a foam having a coating of carbon nanotubes after a longer exposure to conditions for nanotube growth.
Figure 2C:
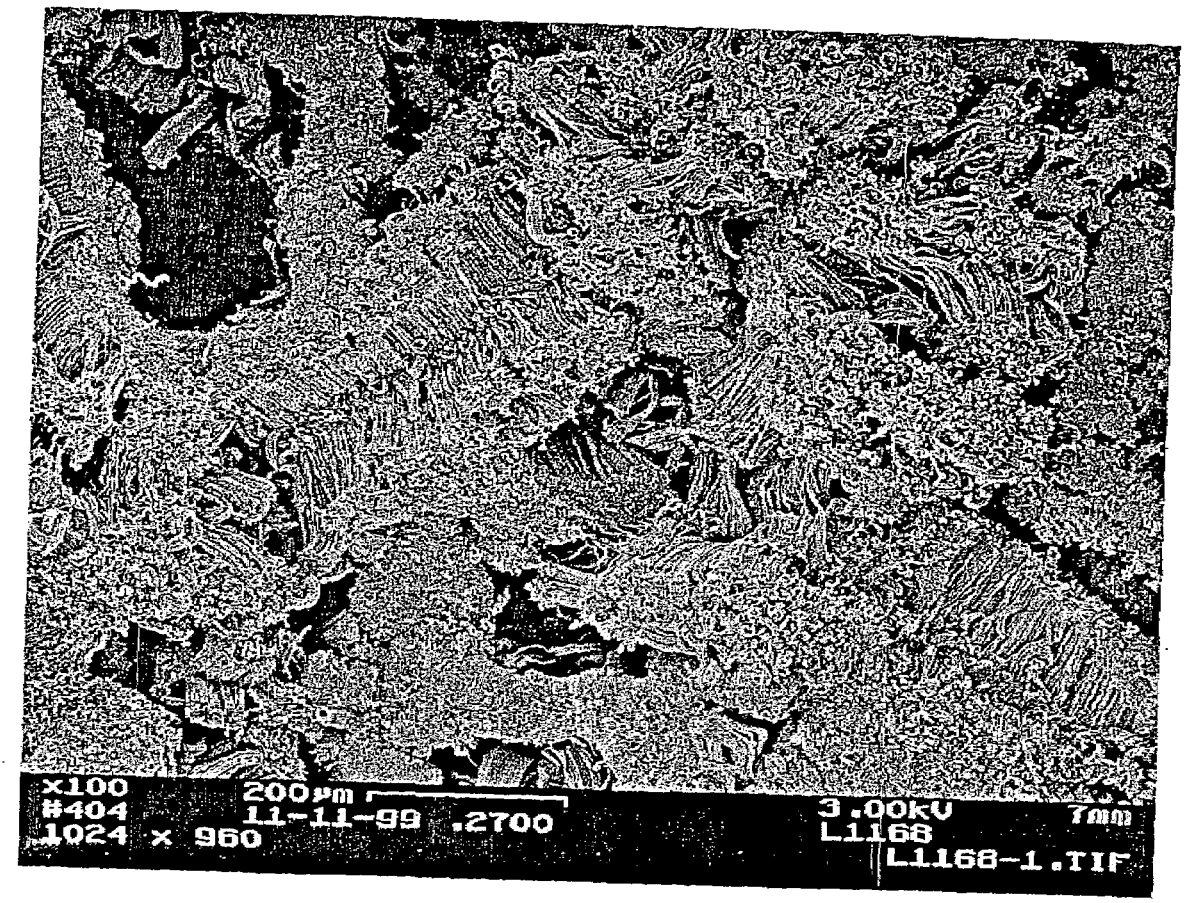
FIG. 2c shows an SEM of a foam having a coating of carbon nanotubes after a still longer exposure to conditions for nanotube growth.
Figure 3A:
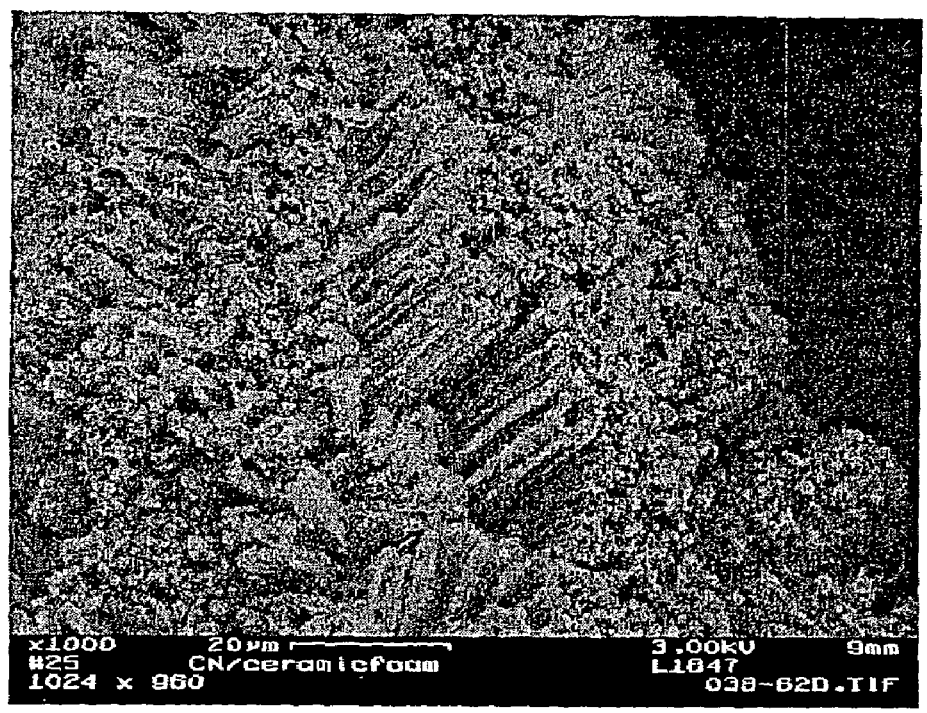
FIG. 3a shows an SEM of a ceramic foam having a coating of carbon nanotubes.
Figure 3B:
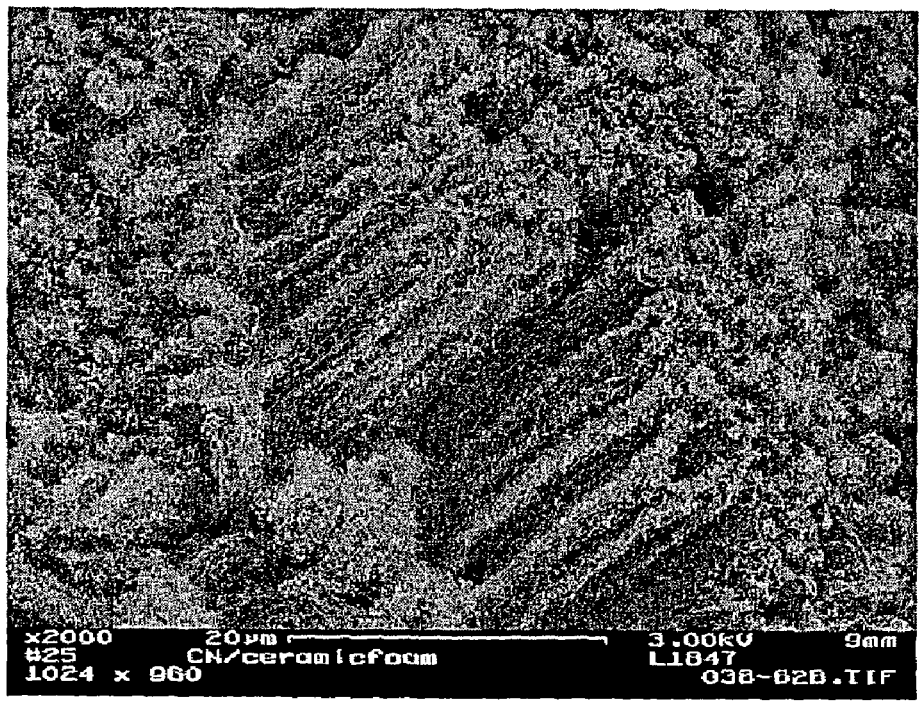

The effects of extending the period of nanotube growth conditions can be seen by comparing FIG. 2a with 2b (longer growth time) and 2c (longest growth time). Extensive nanotube growth may have the effect of closing up the pore structure of a large pore support. SEM views of carbon nanotubes on ceramic monolith at various magnifications are shown in FIGS. 3a-3c. The appearance is very similar to the growth on metal foams under similar conditions.

Figure 4A:
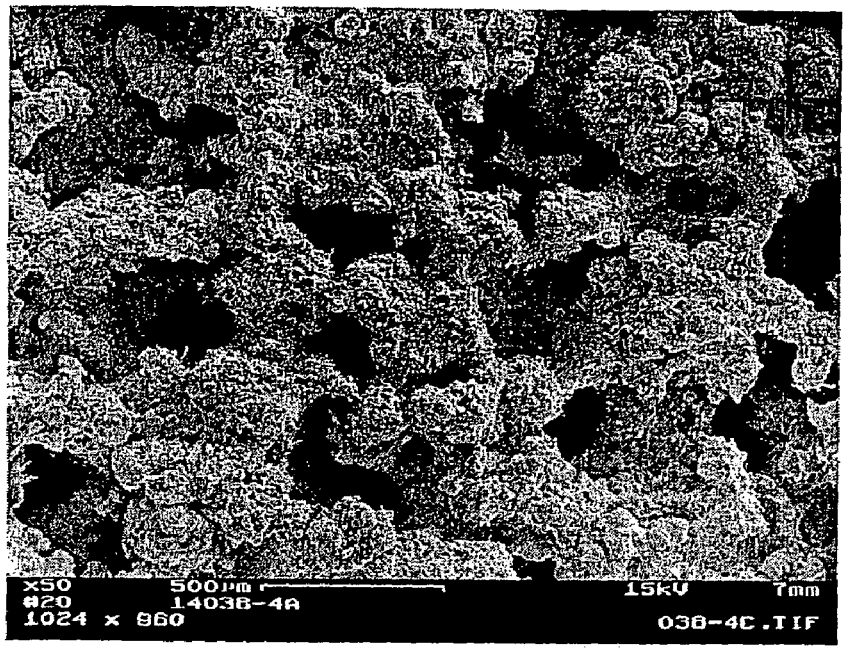
FIG. 4a shows an SEM of a metal foam having a coating of carbon nanotubes and a surface wash coat of alumina.
Figure 4B:
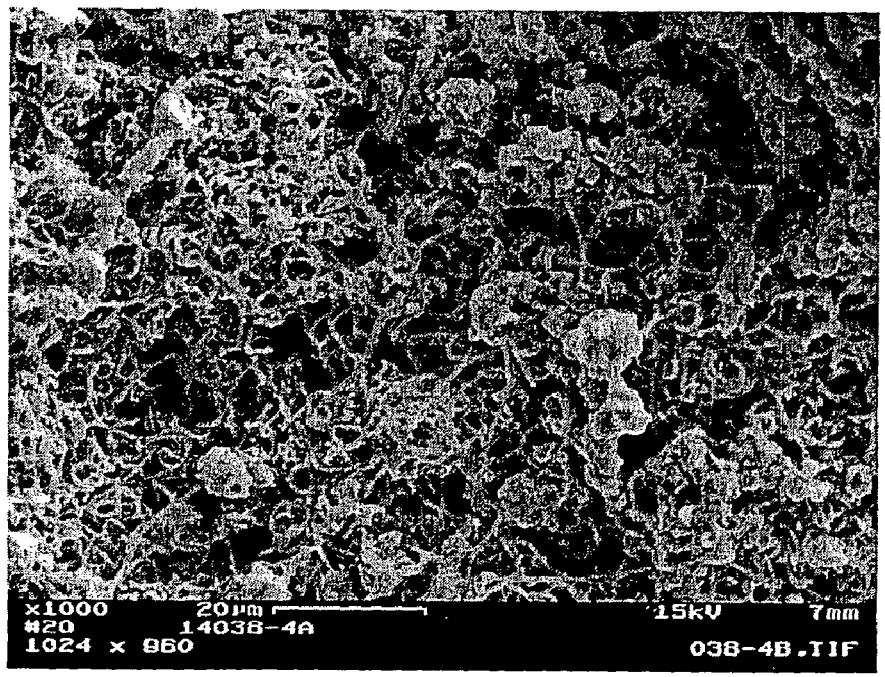
Figure 4C:
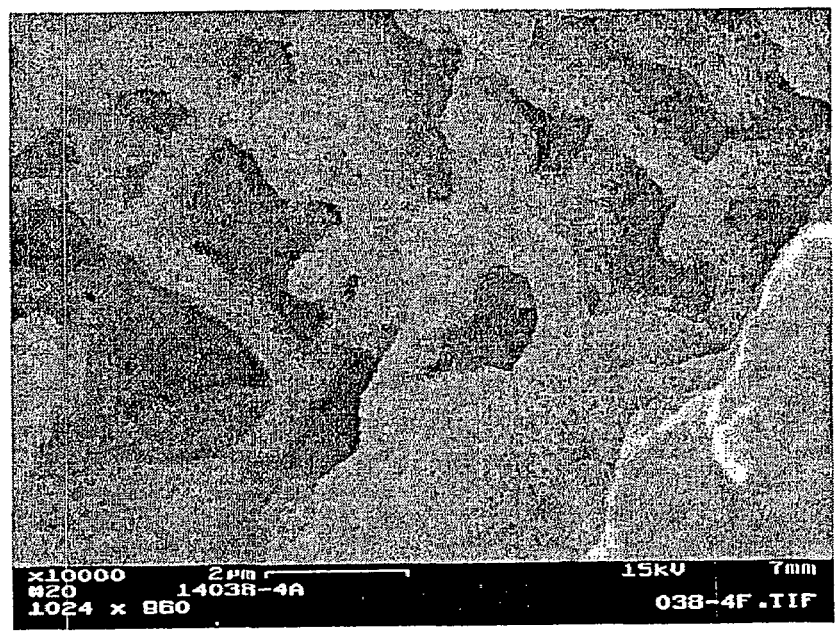
Figure 5:
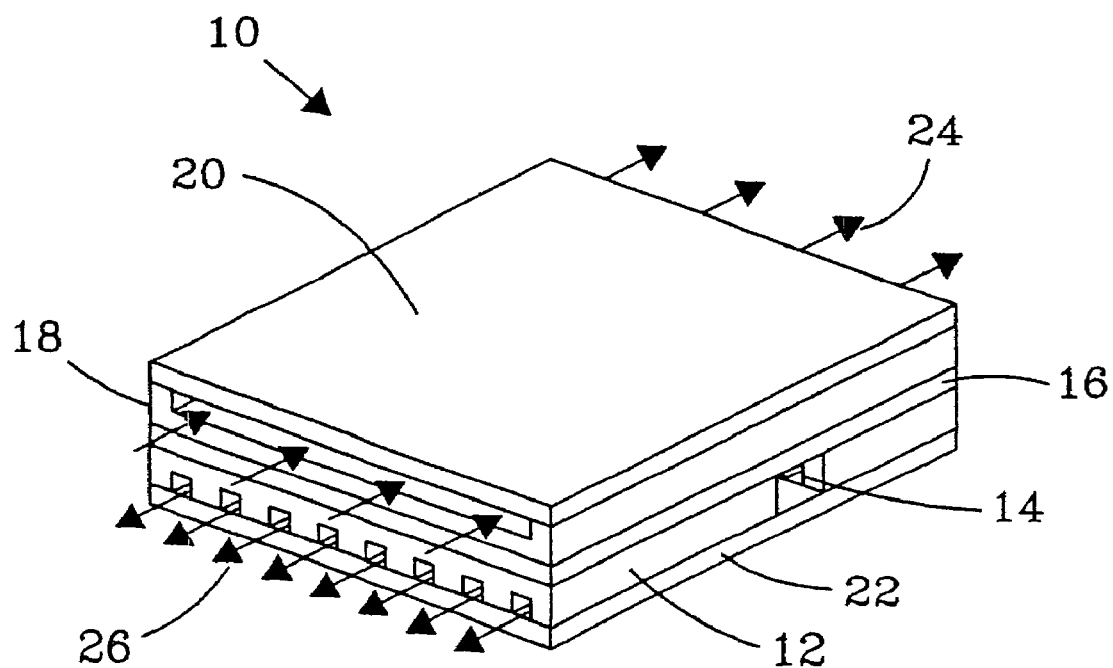
FIG. 5 is an illustration of a microreactor 10, including reaction chamber 18 in which reactants are converted to products 24. An optional thermally conductive separation plate could be used to separate the reaction chamber from microchannel heat exchanger 12, through which flows heat exchange fluid 26.

FIGS. 4a-4c show SEM views of an FeCrAlY foam that has been coated (as described below) with an alumina layer, a mesoporous silica layer, a layer of carbon nanotubes, and a surface layer of alumina. The alignment of carbon nanotubes can be seen if we view nanotubes perpendicular to the nanotube films. However, if nanotubes are viewed from the top of the nanotube films, they appear random as shown in FIG. 4b.

Preparation of Carbon Nanotube Coated Metal Foam

FeCrAlY intermetallic alloy foam (80 ppi, 85% porosity, purchased from Porvair, Hendersonville, N.C.) was heat treated by exposing to air at a temperature of at least 800° C. (ramping rate of 20° C./min, 2 h treatment). The heat treatment results in the formation of a layer of alpha alumina on the surface due to either outward diffusion of Al or inward diffusion of oxygen. Fe/mesoporous silica was coated onto the foam, with a thickness preferably ranging from 0.1 μm to 5 μm, using a dip-coating method. This Fe/mesoporous silica was prepared from a templating surfactant composition containing a mixture of alcohol, surfactant, water, silica, and iron precursors. To enhance the adhesion between the metal foam and the Fe/mesoporous silica catalyst, a dense and pinhole-free interfacial layer was first coated onto the oxidized FeCrAlY foam by metal organic chemical vapor deposition (MOCVD). This interfacial layer can be $Al_2O_3$, $Al_2O_3+SiO_2$, or $TiO_2$, etc. For example, when $TiO_2$ was coated, titanium isopropoxide (Strem Chemical, Newburyport, Mass.) was vapor deposited at a temperature ranging from 250 to 900° C. at a pressure of 0.1 to 100 torr. Titania coatings with excellent adhesion to the foam were obtained at a deposition temperature of 600° C. and a reactor pressure of 3 torr. This layer not only increases the adhesion between metal foam and the Fe/mesoporous silica, it also protects the FeCrAlY from corrosion during the subsequent carbon nanotube growth and reaction.

A layer of Fe/mesoporous silica was dip-coated onto the foam from a templating surfactant composition to yield a high surface area silica layer containing dispersed Fe particles. High surface area ensures a high carbon nanotube growth rate and a high carbon nanotube density per surface area. Upon high temperature calcination, the precursors decomposed to form a layer of $Fe/SiO_2$, typically with a thickness of 0.5-3 μm, which served as the seeding layer for carbon nanotube growth. It should be noted that preparation of this seeding layer is not limited to the one step dip-coating method with a Fe containing templating surfactant composition, as mentioned above. It can also be done by conventional methods such as incipient wetness impregnation or vapor phase impregnation of Fe precursors on a pre-deposited silica layer. In addition, the choice of catalytic active metals is not limited to Fe, other metals such as Co and Ni have been demonstrated to be able to decompose gas phase carbon containing molecules to form carbon nanotubes.

As compared to using a wash coat slurry formed from preformed $Fe/SiO_2$ powder onto the metal foam, dip coating the foam substrate with a sol gel solution has unexpectedly been found to have significant advantages. The dip coating approach uses direct gelation method, where the sol solution is gelled and dried onto the metal foam. During the drying and gelation process, the mesoporous materials adhere strongly onto the metal foam, thus providing an intimate contact between the foam and the $Fe/SiO_2$ coating without any void micropores on the interface which would hamper heat transfer in the final engineered catalyst during reaction.

The carbon nanotube growth was carried out at temperatures of 600-1000° C., depending on the carbon sources and the catalysts. A carbon containing gas source such as ethylene, acetylene, CO, was introduced to the substrate for 5-20 min, where the well-aligned carbon nanotubes were formed by reaction between the C gas source and the Fe particles. In this particular example, ethylene was used. The growth rate and length of carbon nanotubes were controlled by both temperature and duration. During the growth, the gas was introduced into the chamber at a period of not more than 20 min, since longer growth time resulted in deposition of amorphous carbon and randomly aligned tubes. If necessary, a growth cycle was conducted. Between the growths, $O_2/N_2$ with <500 ppm of $O_2$ was introduced to the chamber for 5 min to oxidize any amorphous carbon deposited. A growth rate of 0.5-5 μm/min was typically observed.

The as grown carbon nanotubes are hydrophobic in nature, thus, conventional aqueous solutions containing metal or metal oxide catalyst precursors adsorb minimally on these nanotubes sponges. For this reason, surface treatment prior to dip coating of catalytic components is highly desirable to modify surface properties. In order to enhance the adsorption of catalyst precursors, the nanotube sponges can be either oxidized at moderate temperature (such as 450° C.) in the presence of $O_2$ for 5 min or etching in a nitric acid solution (at room temperature). After treated with these procedures, the uptake of the precursor solvents increases dramatically. After dip coating, the substrate is annealed at high temperature to remove the $H_2O$ absorbed by capillary forces within the sponge structure and to decompose the metal precursors.

In order to further modify the surface of carbon nanotubes, a layer of thin oxide film can be deposited on the treated carbon nanotubes by immersing the substrate into a surfactant templated sol solution containing the ceramic and metal precursors. In this case, templated liquid crystals preferentially anchor on the surface of the nanotubes. Subsequent drying and annealing at high temperature removes the surfactant molecules, resulting in an oxide layer with well-defined pore structures that adhere strongly onto the nanotube surface. The physical properties of the oxide formed depend on the surfactant/alcohol/water/precursor ratio.

In an alternate method, nano-size $Al_2O_3$ particles were deposited by dipping carbon nanotube coated metal foams in an $Al_2O_3$ colloid solution. The weight percentage of the colloid solution varied from 5% to 20% to control the $Al_2O_3$ loading in the carbon nanotube sponge. The solvent of the colloid solution also varied from pure water to 25 wt. % water/75 wt. % ethanol to control the surface tension of the colloid solution. After dipping in the colloid solution for >1 min, the coated metal foams were removed from the solution, and the excess solution was then removed on filter papers. The coated metal foams were rapidly dried in a few minutes under vacuum (<1 torr) at room temperature. Low temperature annealing (e.g. 450° C. in air for 0.5 hr) was necessary to completely remove the solvent. FIGS. 3a and 3b show typical SEM images of an alumina-coated-carbon-nanotube-coated-metal-foam that was coated using 8 wt. % $Al_2O_3$ colloid solution.

Preparation of Fischer-Tropsch Catalysts

Using the above method, an engineered catalyst was fabricated. The FeCrAlY intermetallic foam (80 ppi, 85% porosity) with the dimensions of 0.30"×1.4"×0.06" was first oxidized at 900° C. in air for 2 h, and then coated with a submicron layer of $Al_2O_3$ using MOCVD. The MOCVD was carried out using aluminum isopropoxide as the precursor with $N_2$ carrier gas in an oxidizing environment containing 14 vol % of $O_2$ under 5 Torr at 850° C. The aluminum isopropoxide precursor was stored in a bubbler where the vapor pressure was controlled by changing the bubbler temperature. In this case, the temperature was controlled at 106° C. The coated foam was cooled to room temperature after the MOCVD.

A surfactant templated solution was prepared according to weight ratio of: $C_{16}EO_{10}$ (polyoxyethylene 10 cetyl ether): ETOH:TEOS:HCl:Fe(NO$_3$)$_2$.9H$_2$O:H$_2$O of 17.5:75:40:1:40:100. The preparation began with two separate solutions, i.e. an alcohol based and an aqueous solution, prepared according to the weight ratio mentioned above, then mixed together during the final stirring step.

To prepare the alcohol-based solution, the $C_{16}EO_{10}$ surfactant was first dissolved in ethanol under continuous stirring for 1 h at 40° C. on a hot/stir plate. The heat setting on the hot plate was turned off after 1 h stirring before TEOS (tetraethylorthosilicate) and 12 M HCl were consecutively added into the solution. Between the additions, the solution was aged and stirred for a 1 h period. The $C_{16}EO_{10}$ (polyoxyethylene 10 cetyl ether):ETOH:TEOS:HCl ratio was 17.5:75:40:1. (Another preparation used 3.16 mL H2O, 8.08 g EtOH, 0.173 g HCl, 4.075 g $C_{16}EO_{10}$, and 8 mL TEOS. Sometimes, the $H_2O$ was replaced by EtOH, and no HCl was used.

Separately, an aqueous Fe nitrate solution was prepared according to a ratio of: Fe(NO$_3$)$_2$.9H$_2$O:H$_2$O of 40:100. The Fe precursor was first dissolved in de-ionized water and stirred for at least 1 h. Both solutions were mixed together and stirred for another hour prior to dip coating onto the foam. The excess solution was removed by absorbing onto a filter paper, then the substrate was calcined at a ratio of 1° C./min from room temperature to 450° C., and held isothermally at that temperature for 1 h under air before cooling to room temperature. At this stage, the substrate was ready for the carbon nanotube growth. The substrate was loaded into a 1.25" OD quartz reactor, heated under 500 sccm of $N_2$ flow from room temperature to 700° C. 500 sccm of ethylene was introduced into the flow reactor for three-20 min periods, with 5 min $O_2/N_2$ (~200 ppm $O_2$) purge between those periods. After the combined growth time of 60 min, the substrate was cooled down from 700° C. to 450° C. under $N_2$. At 450° C., air was introduced to the growth chamber for 5 min to oxidize the surface of the carbon nanotube before further cooling to room temperature under $N_2$. The substrate was then dip coated with a colloid alumina solution containing approximately 5 wt % of $Al_2O_3$ which was prepared by mixing a PQ alumina colloidal sol (PQ Corp, AL20DW Lot #30-001598, Ashland, Mass.) with a 1:3 $H_2O$/EtOH solvent, followed by drying at 110° C. before calcining at 350° C. for 3 h in air. The substrate was then dip coated with an aqueous solution containing cobalt and rhenium precursors. Cobalt nitrate hexahydrate and pherrennic acid were used as the precursors, they were co-dissolved in the 4.883 M cobalt and rhenium (Co+Re) solution with Co/Re molar ratio of 29.79, dried at 110° C. then calcined at 350C for 3 h. A catalyst (run ID of MD153 in Table 1 on CNT/FeCrAlY substrate) was prepared containing 0.0431 g Co—Re/Alumina with 37 wt %/Co4 wt % Re. The weights of FeCrAlY foam substrate and carbon nanotubes are 0.3799 g and 0.0675 g, respectively.

Preparation of Fischer-Tropsch Catalysts without Carbon Nanotubes

Co/Re/alumina catalysts were also prepared on the same FeCrAlY substrate without a carbon nanotube layer. The FeCrAlY intermetallic foam (80 ppi, 85% porosity) with the dimensions of 0.30"×1.4"×0.06" was first oxidized at 900° C. in air for 2 h, then was coated with a submicron layer of $Al_2O_3$ using MOCVD at 850° C. The MOCVD was carried out using aluminum isopropoxide as the precursor with $N_2$ carrier gas in an oxidizing environment containing 14 vol % of $O_2$ under 5 Torr at 850° C. The aluminum isopropoxide precursor was stored in a bubbler where the vapor pressure was controlled by changing the bubbler temperature. In this case, the temperature was controlled at 106° C. The coated foam was cooled to room temperature after the MOCVD. The substrate was then dip coated with a colloid alumina solution containing approximately 5 wt % of $Al_2O_3$ which was prepared by mixing a PQ alumina colloidal sol (PQ Corp, Lot #30-001598, Ashland, Mass.) with a 1:3 $H_2O$/EtOH solvent, followed by drying at 110° C. before calcining at 350° C. for 3 h in air. Upon cooling to room temperature, the substrate was dip coated with an aqueous solution containing cobalt and rhenium precursors. Cobalt nitrate hexahydrate and pherrennic acid precursors were co-dissolved in the 4.883 M cobalt and rhenium solution with Co/Re ratio of 29.79, dried at 110° C. then calcined at 350C for 3 h. A catalyst (run ID of MD157 in Table 1 on FeCrAlY substrate) was prepared containing 0.0662 g Co/Re/Alumina with 50 wt %/Co5 wt % Re.

Preparation of Fischer-Tropsch Catalysts without Carbon Nanotubes on Other Metal Substrates Fischer-Tropsch catalysts were also prepared on various other metal foam substrates (Cu, stainless steel, GPM) with the dimensions of 0.30"×1.4"×0.06" without carbon nanotube layer. These metal substrates were purchased from Porvair (Hendersonville, N.C.) with 80 ppi pore density and 85% porosity except that GPM (FeCrAlY) has a much higher pore density (>400 ppi with an average pore size of 30 microns) and lower porosity (70%). These catalysts were prepared as follows. First, acidic gamma-alumina support powder (Engelhard) was ground and sieved to between 70- and 100-mesh (150 to 220-micron), and calcined (stabilized) at 500° C. for several hours. This powder was then impregnated with a solution containing cobalt nitrate hexahydrate and pherenic acid precursors, present in desired concentrations to produce a 20-wt % cobalt, 4-wt % Re on alumina catalyst. The precursor solution was prepared in such a manner as to saturate the pore volume of the alumina support without over saturation of the alumina support. This powder was then dried in a vacuum oven at 100° C. for at least 4 hours, followed by drying at 100° C. for at least 12-hours. The powder was then calcined by heating at 350° C. for at least 3 hours. A portion of the powder was then combined with distilled water in a water-to-catalyst weight ratio of at least 2.5 to produce a catalyst slurry. This catalyst slurry is then placed in a container with inert grinding media balls and placed on a rotating device for at least 24 hours. This slurry was then ready to coat a pre-treated metal foam type support. The metal foam pretreatment consisted of cleaning successively in dichloromethane and acetone solvents in a water bath submersed in a sonication device to agitate the solvent within the foam. Optionally, the metal surface of the monolith may then be roughened by etching with acid. If this is desired, the metal foam is submerged in 0.1-molar nitric acid, and placed in a sonication device. The metal foam was then rinsed in distilled water and dried at about 100° C. The metal foams, except the Cu foam, were then coated with a layer of alumina using a metal organic chemical vapor deposition (MOCVD) technique. Cu foam was used after the cleaning without the CVD $Al_2O_3$ coating. The CVD system has a horizontal, hot-wall reactor with three precursor sources. The CVD coatings are performed at a deposition temperature between 600° C.-850° C. and reactor pressure of 5 torr. Aluminum iso-propoxide was used as the aluminum precursor. This precursor is stored in a quartz container maintained at 106° C. during deposition, which produces a vapor that is carried into the CVD reactor by a flow of nitrogen carrier gas for about 60 minutes. Air was then used to oxidize the aluminum precursor to alumina. Typical thickness of the alumina coatings is about 0.5 μm. This pretreated metal support foam was then coated with the catalyst slurry by dip coating. The metal foam was then dried in flowing air or nitrogen at room temperature while continuously rotating the metal foam in such a way as to create a uniform coverage of the dried catalyst slurry layer. The metal foam was then dried at 90° C. for at least 1-hour, heated slowly to 120° C. over the course of at least-hour, dried further at 120° C. for at least 2 hours, and then heated to 350° C. and calcined for at least 3 hours. The weights of alumina supported Co—Re powder catalyst on the metal foam are listed in Table 1.

Catalyst Activity Comparision

The engineered catalysts aforementioned were placed inside the reaction chamber and activated (or reduced) prior to reaction by heating to about 350° C. to 400° C. and under flow of a hydrogen-containing stream of about 10 to 20% (by mole or volume) hydrogen in an inert carrier gas (such as nitrogen or helium) at a flow rate of at least 20 cc/min (measured at 273 K and 1 atm) for at least 2-hours. The catalyst was then allowed to cool to reaction temperatures, about 266° C. The catalyst was then exposed to a feed gas comprised of $H_2$ and CO in a desired ratio of moles of $H_2$ per mole of CO (2/1). The feed gas flow rate is controllable to allow for precise generation of a desired contact time (250 msec). The reaction products were then analyzed to evaluate the conversion of CO and the selectivity towards certain products, such as methane. The reaction was conducted at a pressure of 16 atmospheres. The results are shown in Table 1. Although carbon nanotube containing catalyst has much lower loading of active components, it has much higher specific activity than other catalysts without carbon nanotubes while maintaining similar methane selectivity.

TABLE 1

Comparison of Fischer-Tropsch Activity with and without Carbon Nanotubes***

| ID | Temp (° C.) | Support | Catalyst** | Weight of Co + Re + $Al_2O_3$ | CO Conv. | CH4 selectivity | specific activity* |
|---|---|---|---|---|---|---|---|
| MD 144 | 266 | Cu | 20% Co—4% Re | 0.174 | 46% | 30% | 1070 |
| MD 145 | 260 | SS | 20% Co—4% Re | 0.182 | 50% | 32% | 1110 |
| MD 151 | 266 | GPM | 20% Co—4% Re | 0.174 | 60% | 26% | 1380 |
| MD 153 | 266 | CNT/ FeCrAlY | 37% Co—4% Re | 0.0493 g | 42% | 27% | 2362 |
| MD 157 | 265 | FeCrAlY | 50% Co—5% Re | 0.662 g | 20% | 31% | 645 |

*mmol CO converted per gram of cobalt (total) per hour
**The balance is $Al_2O_3$
***All experiments were conducted at 16-atm, $H_2$/CO = 2, 250-msec contact time.
Listed performance values were gathered after 96-to 120-hrs TOS when catalyst reached steady state performance.

We claim:

1. A method of converting a chemical reactant, comprising:
   passing at least one reactant into a reaction chamber;
   wherein a catalyst is disposed within the reaction chamber;
   wherein the catalyst comprises:
   a support material having through-porosity;
   wherein the support material has an average pore size, as measured by microscopy, of at least 1 micrometer (·m);
   a layer comprising carbon nanotubes on the support material; and
   a surface-exposed catalyst composition; and
   reacting the at least one reactant in the reaction chamber to produce at least one product;
   wherein the reaction chamber has an interior with a cross-sectional area and the catalyst occupies at least 80% of said cross-sectional area;
   wherein the reaction comprises a reaction selected from the group consisting of: acetylation, addition reactions, alkylation, dealkylation, hydrodealkylation, reductive alkylation, amination, aromatization, arylation, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanol synthesis, methylation, demethylation, metathesis, nitration, partial oxidation, polymerization, reduction, steam and carbon dioxide reforming, sulfonation, telomerization, transesterification, trimerization, water gas shift (WGS), and reverse water gas shift (RWGS).

2. The method of claim 1 wherein the reaction chamber is a microchannel and the catalyst comprises a monolith.

3. A method of converting a chemical reactant, comprising:
   passing at least one reactant into a microchannel reaction chamber;
   wherein the catalyst is disposed within the microchannel reaction chamber;
   wherein the catalyst comprises a support;
   nanotubes disposed over said support and
   a catalyst composition disposed over the nanotubes; and
   reacting the at least one reactant in the microchannel reaction chamber to produce at least one product;
   wherein the reaction comprises a reaction selected from the group consisting of: acetylation, addition reactions, alkylation, dealkylation, hydrodealkylation, reductive alkylation, amination, aromatization, arylation, carbonylation, decarbonylation, reductive carbonylation, carboxylation, reductive carboxylation, reductive coupling, condensation, cracking, hydrocracking, cyclization. cyclooligomerization, dehalogenation, dimerization, epoxidation esterification, exchange, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDNL isomerization, methanol synthesis, methylation, demethylation, metathesis, nitration, partial oxidation, polymerization, reduction, steam and carbon dioxide reforming, sulfonation, telomerization, transesterification, trimerization, water gas shift (WGS), and reverse water gas shift (RWGS).

4. The method of claim 3 wherein the at least one reactant is in liquid solution.

5. The method of claim 3 wherein the catalyst further comprises an oxide disposed over the nanotubes; and a catalyst composition disposed over the oxide.

6. The method of claim 3 wherein the catalyst is disposed on walls of the microchannel reaction chamber.

7. The method of claim 3 wherein the microchannel reaction chamber is adjacent to a microchannel heat exchanger and further wherein heat is transferred between the microchannel reaction chamber and the microchannel heat exchanger.

8. The method of claim 3 wherein the catalyst is a single piece that occupies at least 80% of a cross section of the microchannel reaction chamber.

* * * * *